(12) United States Patent
Herzing et al.

(10) Patent No.: US 7,645,473 B2
(45) Date of Patent: Jan. 12, 2010

(54) FAT COMPOSITION

(75) Inventors: Anthony George Herzing, Channahon, IL (US); Gerald Patrick McNeill, Channahon, IL (US); Harold Kazier, Channahon, IL (US)

(73) Assignee: Loders Croklaan USA LLC, Channahon, IL (US)

( * ) Notice: Subject to any disclaimer, the term of this patent is extended or adjusted under 35 U.S.C. 154(b) by 746 days.

(21) Appl. No.: 11/451,606

(22) Filed: Jun. 13, 2006

(65) Prior Publication Data

US 2007/0286940 A1    Dec. 13, 2007

(51) Int. Cl.
*A23D 9/00* (2006.01)
(52) U.S. Cl. ........................ 426/607; 426/601
(58) Field of Classification Search ............... 426/601, 426/606, 607
See application file for complete search history.

(56) References Cited

U.S. PATENT DOCUMENTS

| | | | |
|---|---|---|---|
| 5,271,950 A | 12/1993 | Yamaguchi et al. | |
| 5,288,513 A | 2/1994 | Cain et al. | |
| 5,718,938 A | 2/1998 | Cain et al. | 426/549 |
| 5,849,940 A | 12/1998 | Harris et al. | 554/206 |
| 5,858,427 A | 1/1999 | Cain et al. | 426/101 |
| 5,935,627 A | 8/1999 | Cain et al. | 426/93 |
| 5,939,114 A | 8/1999 | Cain et al. | |
| 6,277,433 B1 | 8/2001 | Lantz et al. | 426/606 |
| 2005/0142275 A1 | 6/2005 | Bach et al. | |
| 2005/0281935 A1 | 12/2005 | Floter et al. | 426/601 |

FOREIGN PATENT DOCUMENTS

| | | |
|---|---|---|
| CA | 2154570 | 8/1994 |
| EP | 0 536 824 A1 | 4/1993 |
| EP | 0 555 917 A1 | 8/1993 |
| EP | 0 728 415 A1 | 8/1996 |
| EP | 0 731 645 | 9/1996 |
| EP | 0 783 250 A | 7/1997 |
| EP | 0 815 738 A1 | 1/1998 |
| EP | 1 040 761 A1 | 10/2000 |
| WO | WO 95/07619 | 3/1995 |
| WO | WO 96/31240 | 10/1996 |

OTHER PUBLICATIONS

Kallio et al., J. Agric. Food CHem., 49:3363-3369 (2001).
Hui, Y.H., "Edible oil and fat products: products and application technology", Bailey's Industrial Oil & Fat Products, 3:382 (1996) XP002112226.

*Primary Examiner*—Carolyn A Paden
(74) *Attorney, Agent, or Firm*—Morgan Lewis & Bockius LLP

(57) ABSTRACT

A vegetable fat composition comprises glycerides, wherein the triglyceride content of the composition is:
 6 to 20% SSS,
 5 to less than 20% SUS
 5 to less than 25% SSU
 10 to 39% $SU_2$ and
 at least 20% $U_3$,
wherein S is a saturated fatty acid residue having 16 to 24 carbon atoms and U is an unsaturated fatty acid residue having at least 18 carbon atoms and all percentages are by weight based on the total triglycerides present in the composition, the weight ratio SUS/SSU is between 0.5 and 2.0,
the weight ratio of (saturated fatty acid residues having 18 to 24 carbon atoms)/(saturated fatty acid residues having 16 carbon atoms) in the total S content of the triglycerides is less than 0.2,
and the triglycerides contain less than 3% of arachidic and behenic acid residues based on the total fatty acid residue content of the triglycerides,
and wherein the saturated fatty acid residue content of the triglycerides is less than 45% by weight of the total fatty acid residues in the triglycerides. The composition may be used to produce baked products and iced confectionery products.

26 Claims, No Drawings

FAT COMPOSITION

BACKGROUND OF THE INVENTION

This invention relates to a fat composition. In particular, the invention relates to a vegetable fat composition comprising glycerides and to its applications in baked products and iced confectionery products.

Many food products contain fats. Due to perceived health benefits, there is a desire amongst consumers for food products that have a low content of trans fatty acids and a low content of saturated fatty acids (SAFA). In order to achieve these aims, it is necessary to modify the triglyceride composition of the fats. However, this is a complex problem since most fats rely on the fatty acids of the component triglycerides, for example the saturated fatty acids, in order to achieve the correct balance of organoleptic properties. Simply lowering the SAFA content of the fat will not necessarily lead to a product that is acceptable to the consumer.

Triglyceride fats are often characterized in terms of their fatty acid content. The term fatty acid generally refers to straight chain carboxylic acids having from 12 to 24 carbon atoms and is used herein to refer to the carboxylic acid residues bound to the glycerol moiety in the triglyceride, and not to free carboxylic acid. Typically, the abbreviation S is used to denote a saturated fatty acid residue having 16 to 24 carbon atoms and U denotes an unsaturated fatty acid residue having at least 18 carbon atoms. Thus, for example, a pure triglyceride containing three saturated fatty acid residues is denoted SSS (or $S_3$) and a triglyceride having saturated fatty acids at the 1 and 3 positions and an unsaturated fatty acid at the 2-position is denoted SUS. $S_2U$ refers to combined SSU and SUS, and $SU_2$ refers to combined SUU and USU.

Examples of fat compositions for use in food products are disclosed in the following documents.

U.S. Pat. No. 5,939,114 describes ice cream coating compositions containing triglyceride fats. The fats have a low level of UUU triglycerides of less than 10% by weight.

EP-A-0815738 discloses non-trans, non-temper filling fats. In the examples, the fats have a SSS content of less than 6% by weight and a SUS content of greater than 20% by weight.

WO 95/07619 relates to healthy fat spreads. The fats contain relatively high levels of $C_{18}$ to $C_{24}$ fatty acid residues.

EP-A-0731645 describes healthy fat-containing blends having an $SU_2$ content of at least 40% by weight.

EP-A-0728415 discloses heat-set, flour-based products containing a fat. The fat has an SUS content of 35-80% by weight.

U.S. Pat. No. 5,288,513 relates to non-temper filling fats comprising a fat blend. The fat has a SSS content of less than 5% by weight.

EP-A-0783250 describes flexible ice cream coating compositions comprising a sugar and a fat. The fat has an SUS content of 25 to 80% by weight.

U.S. Pat. No. 5,271,950 discloses chocolate compositions. In the examples, the compositions have a relatively high level of $C_{18}$ to $C_{24}$ fatty acid residues.

WO 96/31240 relates to a method of increasing the HDL concentration and the HDL/LDL concentration ratio in human serum by providing a balance between a sufficient and required proportion of cholesterol-free saturated fatty acids in the daily diet.

US 20050142275 describes non-lauric, non-trans, non-temper fat compositions that have relatively high levels of arachidic and behenic acids.

Our copending applications, U.S. Ser. Nos. 10/986,044 and 10/972,615 relate to frying fats and oils and to coating compositions for bakery products, respectively.

There remains a need for good quality bakery fats with low trans content and low saturated fatty acid (SAFA) content.

SUMMARY OF THE INVENTION

According to the invention in a first aspect, there is provided a vegetable fat composition comprising glycerides, wherein the triglyceride content of the composition is:

6 to 20% SSS,
5 to less than 20% SUS
5 to less than 25% SSU
10 to 39% $SU_2$ and
at least 20% $U_3$, wherein S is a saturated fatty acid residue having 16 to 24 carbon atoms and U is an unsaturated fatty acid residue having at least 18 carbon atoms and all percentages are by weight based on the total triglycerides present in the composition, the weight ratio SUS/SSU is between 0.5 and 2.0, the weight ratio of (saturated fatty acid residues having 18 to 24 carbon atoms)/(saturated fatty acid residues having 16 carbon atoms) in the total S content of the triglycerides is less than 0.2, and the triglycerides contain less than 3% of arachidic and behenic acid residues based on the total fatty acid residue content of the triglycerides, and wherein the saturated fatty acid residue content of the triglycerides is less than 45% by weight of the total fatty acid residues in the triglycerides.

It will be understood that S and U may be single fatty acids residues or, more typically, mixtures of different fatty acid residues.

In a second aspect, the invention provides a method of producing a baked product which comprises preparing a mixture and baking the mixture, and which comprises the step of incorporating the composition of the invention in the mixture.

A third aspect of the invention is a method of producing an iced confectionery product which comprises applying to a baked product an icing comprising the composition of the invention.

A further, fourth aspect of the invention is the use of the composition of the invention as an ingredient in baking.

A fifth aspect of the invention is a bakery composition comprising the composition of the invention and one or more other baking ingredients.

The invention also provides, in a sixth aspect, an icing composition comprising the composition of the invention, sugar and water.

A seventh aspect of the invention is a baked product comprising the composition of the invention.

DETAILED DESCRIPTION OF THE INVENTION

In a further, eighth aspect, the invention provides a method of producing the composition of the invention, which comprises blending a mixture of fats including (i) an interesterified palm olein with an iodine value of 45 to 70 and (ii) a palm oil fraction with an SUS-content of less than 50 wt % and an SSS-content of at least 20%.

The present invention is based on the finding of a fat composition which has particularly beneficial properties when used in bakery applications and in confectionery icing. The composition has a low SAFA and a low trans fatty acid content and yet can have desirable organoleptic properties, including structure and appearance of the finished product and mouth feel. The composition can also be produced economically on a commercial scale.

The composition of the invention may be produced as a blend of fats including (i) an interesterified palm olein with an iodine value of 45 to 70 and (ii) a palm oil fraction with an SUS-content of less than 50 wt % and an SSS-content of at least 20 wt %. For example, the blend of fats may include (i) an interesterified palm olein with an iodine value of 50 to 70 and (ii) a palm oil fraction with an SUS-content of less than 40 wt % and an SSS-content of at least 25 wt %. More preferably, the blend is a blend of at least three components, further comprising a liquid oil. Suitable liquid oils include canola oil.

The composition of the invention preferably has a $S_2U$ content of less than 35% by weight, more preferably less than 30% by weight, such as from 24 to 28% by weight. Typically, SUS content is from 10 to 18% by weight (such as from 12 to 16% by weight). The content of SSU is typically 8 to 16% by weight (such as from 10 to 14% by weight).

The $S_3$ content of the composition of the invention is preferably greater than 8%, such as from 8 to 12% by weight.

The $SU_2$ content of the composition is preferably from 15 to 30% by weight, more preferably from 20 to 24% by weight. The USU content is typically from 2 to 6% by weight. The SUU content is typically from 10 to 25% by weight, such as from 16 to 20% by weight.

The $U_3$ content of the composition is preferably from 30 to 50% by weight, such as from 35 to 45% by weight.

The weight ratio of $S_2Ln$ to $S_2O$ in the compositions of the invention (where Ln is linoleic acid (C18:2) and O is U other than Ln) is preferably less than 0.40, more preferably less than 0.30.

The weight ratio of (saturated fatty acid residues having 18 to 24 carbon atoms)/(saturated fatty acid residues having 16 carbon atoms) in the total S content of the triglycerides in the compositions of the invention is preferably less than 0.15.

Fatty acids (and their residues) are sometimes expressed in the form Cx:y, where x is the number of carbon atoms in the fatty acid (or residue) and y is the number of carbon-carbon double bonds.

The preferred C16:0 fatty acid content of the composition is from 20 to 40% by weight, preferably from 25 to 35% by weight. Preferably, the composition has a C18:1 content of from 30 to 60% by weight, such as from 40 to 50% by weight. The C18:2 content is preferably from 6 to 20% by weight, such as from 10 to 16% by weight. The preferred C18:0 content of the composition is less than 5% by weight, such as from 2 to 4% by weight. All percentages of fatty acids are based on the weight of the total fatty acid residues in the triglycerides.

The triglycerides of the composition of the invention contain less than 3% of arachidic and behenic acid residues based on the total fatty acid residue content of the triglycerides. Preferably, they contain less than 2% or less than 1% by weight of arachidic and behenic acid residues.

The saturated fatty acid residue (SAFA) content of the triglycerides in the composition of the invention is preferably less than 40% by weight of the total fatty acid residues in the triglycerides. The preferred total content of polyunsaturated C18:2 and C18:3 fatty acid residues is preferably less than 25% by weight, more preferably less than 20% by weight, such as 10 to 20% by weight of the total fatty acid residues in the triglycerides. The preferred total content of monounsaturated C18:1 and C20:1 fatty acid residues is preferably from 35 to 60% by weight, more preferably from 40 to 50% by weight, based on the total fatty acid residues in the triglycerides.

In a preferred embodiment of the invention, the triglyceride content of the composition is:
  8 to 15% SSS,
  11 to 18% SUS
  8 to 16% SSU
  18 to 25% $SU_2$ and
  at least 35% $U_3$.

wherein all percentages are by weight based on total triglycerides.

The composition of the invention preferably has an $N_{10}$ of 20 to 50, more preferably from 30 to 40. Additionally or alternatively, the composition preferably has an $N_{20}$ of 10 to 35, more preferably from 15 to 30. Additionally or alternatively, the composition preferably has an $N_{30}$ of less than 18, more preferably from 3 to 15. These N values are based on unstabilized fats. Thus, the term Nx refers to solid fat content, measured by NMR pulse techniques on unstabilized fats. Unstabilized meaning that the fat was melted at 80° C., kept at 60° C. for 5 minutes, cooled to 0° C., kept at 0° C. for 1 hour and kept at measurement temperature for 30 minutes.

Preferably, the composition of the invention is essentially free of trans fatty acid residues. For example, the composition may contain trans fatty acid residues in the triglycerides in an amount of less than 1% by weight, more preferably less than 0.5% by weight, such as less than 0.1% by weight. Typically, the only trans fatty acid residues present in the compositions will be the low levels that occur in the natural products from which the composition is preferably derived.

The compositions of the invention are vegetable fats. By this, we mean that the fat compositions are principally or wholly derived from fats from vegetable sources, either directly or indirectly, rather than being derived from animals. Typically, the compositions of the invention will comprise at least 50% by weight of fats derived from vegetable sources, more preferably at least 60% by weight, such as at least 70%, at least 80%, at least 90%, at least 95% or even 100% by weight.

The compositions of the invention may be produced by blending commercially available fats. For example, the compositions may be produced by a method which comprises blending a mixture of fats including (i) an interesterified palm olein with an iodine value of 45 to 70 and (ii) a palm oil fraction with an SUS-content of less than 50 wt % and an SSS-content of at least 20 wt %. An example of (i) is interesterified palm oleine having an iodine value of 55. An example of (ii) is palm stearine having an iodine value of 35. Preferably the mixture of fats is a blend of at least three components, further comprising a liquid oil, such as canola oil. The amounts of the components of the blend are selected so as to achieve the desired triglyceride composition. When a three component blend of (i), (ii) and liquid oil is used, the weight amounts are typically 20 to 50% (more preferably 30 to 40%) liquid oil, 30 to 50% (more preferably 38 to 48%) of (i) and 10 to 30% (more preferably 15 to 25%) of (ii). General methods of blending fats, and apparatus for this purpose, are well known in the art.

Compositions of the invention may be used as shortening in bakery products or as components of icing compositions for confectionery. Compositions of the invention may impart one or more beneficial properties to the finished product including mouthfeel, appearance, structure (including, for baked products, crumb firmness) and/or aeration.

For shortening, the compositions may be used alone or in combination with one or more conventional fats. Preferably, the compositions are used alone. Bakery products are typically baked in an oven and include cakes, cookies, biscuits, buns and bread.

Bakery compositions of the invention comprise the composition of the invention and one or more other baking ingredients, such as flour or baking colourants or preservatives.

Icing compositions of the invention comprise the composition of the invention, sugar (e.g., sucrose) and water. The compositions are typically used to apply a partial or complete coating of icing to confectionery products such as cakes, buns, cookies or biscuits. The icing compositions optionally comprise one or more flavouring agents and/or one or more colourants and may comprise one or more other fats.

All publications, patents and patent applications are incorporated herein by reference. While in the foregoing specification this invention has been described in relation to certain preferred embodiments thereof, and many details have been set forth for purposes of illustration, it will be apparent to those skilled in the art that the invention is susceptible to additional embodiments and that certain of the details described herein may be varied considerably without departing from the basic principles of the invention.

The following non-limiting examples illustrate the invention and do not limit its scope in any way. In the examples and throughout this specification, all percentages, parts and ratios are by weight unless indicated otherwise. Fatty acid (residue) contents are expressed by weight based on the weight of the total fatty acid residues in the triglycerides, calculated as free (i.e., hydrolysed) fatty acids. Triglyceride contents are expressed by weight based on the weight of total triglycerides present in the composition.

EXAMPLES

Example 1

Preparation of Reduced Saturate Shortening

A reduced saturate fat blend according to the invention was prepared by blending together three components: (1) commercially available refined, bleached and deodorized canola oil purchased locally; (2) commercially available refined, bleached deodorized palm stearine with an iodine value of 35, obtained from Loders Croklaan USA (Channahon, Ill.); and (3) commercially available fully interesterified palm olein with an iodine value of 55 (refined, bleached and deodorized), obtained from Loders Croklaan USA.

The components were melted and blended together in a tank to a final weight of 91 kg (200 pounds) according to the formula below:

| | |
|---|---|
| Canola Oil | 33 kg (72 lbs) |
| Palm Stearine (IV35) | 19 kg (42 lbs) |
| Interesterified Palm Oleine (IV55) | 39 kg (86 lbs) |

The blend was stirred to fully mix the components and passed through three cooling tubes with agitation to crystallize the blend into a smooth, semi-solid mass suitable for use as a bakery shortening. This product was then evaluated for functionality in baked goods.

Analysis

The product of Example 1 has the following calculated triglyceride composition:

| | Weight % |
|---|---|
| SSS | 10 |
| SUS | 14 |
| SSU | 12 |
| USU | 4 |
| SUU | 18 |
| UUU | 42 |

In more detail, the composition is as follows:

| | Weight % |
|---|---|
| SSS | 10 |
| SOS | 11 |
| SSO | 9 |
| SLnS | 3 |
| SSLn | 3 |
| OSO | 4 |
| SOO | 11 |
| SOLn | 7 |
| OOO | 19 |
| 3+ | 23 |

The following is the calculated fatty acid content of the product:

| | Weight % |
|---|---|
| C14:0 | 1 |
| C16:0 | 31 |
| C18:0 | 3 |
| C18:1 | 46 |
| C18:2 | 13 |
| C18:3 | 4 |
| C20:1 | 1 |
| Others | 1 |

The calculated N Values (unstabilised) of the product are:

| | % |
|---|---|
| N10 | 37.08 |
| N20 | 23.89 |
| N25 | 18.41 |
| N30 | 13.69 |
| N35 | 9.62 |
| N40 | 6.72 |

Example 2

Evaluation of Reduced Saturate Bakery Shortening Prepared in Example 1

A cookie was prepared with the shortening from Example 1. This was almost indistinguishable in texture and mouthfeel from cookies made with a high saturate shortening (50% saturates). The advantage over a simple blend of canola oil and palm stearine (IV35) with 35% saturates, was the ability of the shortening to cream with the sugar and maintain aeration. Finished cookies prepared with simple blends lacked desired structure, exhibited excess spread, crumb firmness (lack of tenderness) and had greasy/oily mouthfeel.

Example 3

Use of Blend of Example 1 in Cake Icing

Cake icing was prepared by blending the reduced saturated shortening from Example 1 with confectionery sugar, shortening and water, followed by aeration in a Hobart mixer. The icing was comparable to a high saturate shortening (50% saturates) with respect to texture and degree of aeration (as measured by specific gravity) immediately after manufacture and during subsequent storage.

For comparison, another formula with reduced saturates (also approximately 35% saturates) was made from a simple blend of canola oil and palm stearine (IV35) that was solidified according to Example 1. Icings prepared with this blend aerated well initially, but quickly lost structure and aeration during storage. As a result, this icing had an undesirable shiny/oily appearance and a gritty mouthfeel.

The invention claimed is:

1. A vegetable fat composition comprising glycerides, wherein the triglyceride content of the composition is:
   6 to 20% SSS,
   5 to less than 20% SUS
   5 to less than 25% SSU
   10 to 39 $SU_2$ and
   at least 20% $U_3$,
wherein S is a saturated fatty acid residue having 16 to 24 carbon atoms and U is an unsaturated fatty acid residue having at least 18 carbon atoms and all percentages are by weight based on the total triglycerides present in the composition, the weight ratio SUS/SSU is between 0.5 and 2.0, the weight ratio of (saturated fatty acid residues having 18 to 24 carbon atoms)/(saturated fatty acid residues having 16 carbon atoms) in the total S content of the triglycerides is less than 0.2, and the triglycerides contain less than 3% of arachidic and behenic acid residues based on the total fatty acid residue content of the triglycerides, and wherein the saturated fatty acid residue content of the triglycerides is less than 45% by weight of the total fatty acid residues in the triglycerides.

2. Composition as claimed in claim 1, which is a blend of fats including (i) an interesterified palm olein with an iodine value of 45 to 70 and (ii) a palm oil fraction with an SUS-content of less than 50 wt % and an SSS-content of at least 20 wt %.

3. Composition as claimed in claim 2, which is a blend of fats including (i) an interesterified palm olein with an iodine value of 50 to 70 and (ii) a palm oil fraction with an SUS-content of less than 40 wt % and an SSS-content of at least 25 wt %.

4. Composition as claimed in claim 2, which is a blend of at least three components, further comprising a liquid oil.

5. Composition as claimed in claim 4, wherein the liquid oil is canola oil.

6. Composition as claimed in claim 1, wherein the $S_2U$ content is less than 35%.

7. Composition as claimed in claim 1, wherein the $S_3$ content is greater than 8%.

8. Composition as claimed in claim 1, wherein the weight ratio of (saturated fatty acid residues having 18 to 24 carbon atoms)/(saturated fatty acid residues having 16 carbon atoms) in the total S content of the triglycerides is less than 0.15.

9. Composition as claimed in claim 1, wherein the saturated fatty acid residue content of the triglycerides is less than 40% by weight of the total fatty acid residues in the triglycerides.

10. Composition as claimed in claim 1, wherein the triglyceride content of the composition is:
    8 to 15% SSS,
    11 to 18% SUS
    8 to 16% SSU
    18 to 25% $SU_2$ and
    at least 35% $U_3$.

11. Composition as claimed in claim 1 having an $N_{10}$ of 20 to 50.

12. Composition as claimed in claim 1 having an $N_{10}$ of 30 to 40.

13. Composition as claimed in claim 1 having an $N_{20}$ of 10 to 35.

14. Composition as claimed in claim 1 having an $N_{20}$ of 15 to 30.

15. Composition as claimed in claim 1 having an $N_{30}$ of less than 18.

16. Composition as claimed in claim 1 having an $N_{30}$ of 3 to 15.

17. Composition as claimed in claim 1 which is essentially free of trans fatty acid residues.

18. A method of producing a baked product which comprises preparing a mixture and baking the mixture, and which comprises the step of incorporating the composition of claim 1 in the mixture.

19. A method of produced an iced confectionery product which comprises applying to a baked product an icing comprising the composition of claim 1.

20. The use of the composition of claim 1 as an ingredient in baking.

21. Bakery composition comprising the composition of claim 1 and one or more other baking ingredients.

22. Icing composition comprising the composition of claim 1, sugar and water.

23. Baked product comprising the composition of claim 1.

24. Iced confectionery product comprising the composition of claim 1.

25. A method of producing the composition of claim 1, which comprises blending a mixture of fats including (i) an interesterified palm olein with an iodine value of 45 to 70 and (ii) a palm oil fraction with an SUS-content of less than 50 wt % and an SSS-content of at least 20 wt %.

26. Method as claimed in claim 25, wherein the mixture of fats is a blend of at least three components, further comprising a liquid oil.

* * * * *

UNITED STATES PATENT AND TRADEMARK OFFICE
CERTIFICATE OF CORRECTION

| | | |
|---|---|---|
| PATENT NO. | : 7,645,473 B2 | Page 1 of 1 |
| APPLICATION NO. | : 11/451606 | |
| DATED | : January 12, 2010 | |
| INVENTOR(S) | : Herzing et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 883 days.

Signed and Sealed this

Sixteenth Day of November, 2010

David J. Kappos
*Director of the United States Patent and Trademark Office*